Jan. 7, 1941.   J. C. AHRENS   2,227,774

CULTIVATOR WEEDER ATTACHMENT

Filed March 9, 1939   2 Sheets-Sheet 1

John C. Ahrens INVENTOR

BY Victor J. Evans & Co.

ATTORNEYS

Jan. 7, 1941. J. C. AHRENS 2,227,774
CULTIVATOR WEEDER ATTACHMENT
Filed March 9, 1939 2 Sheets-Sheet 2
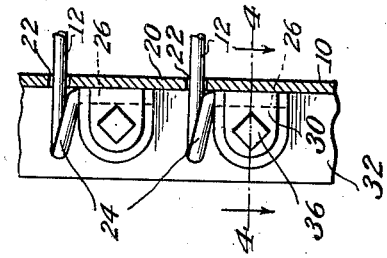
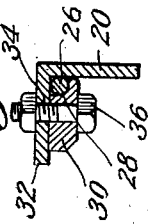
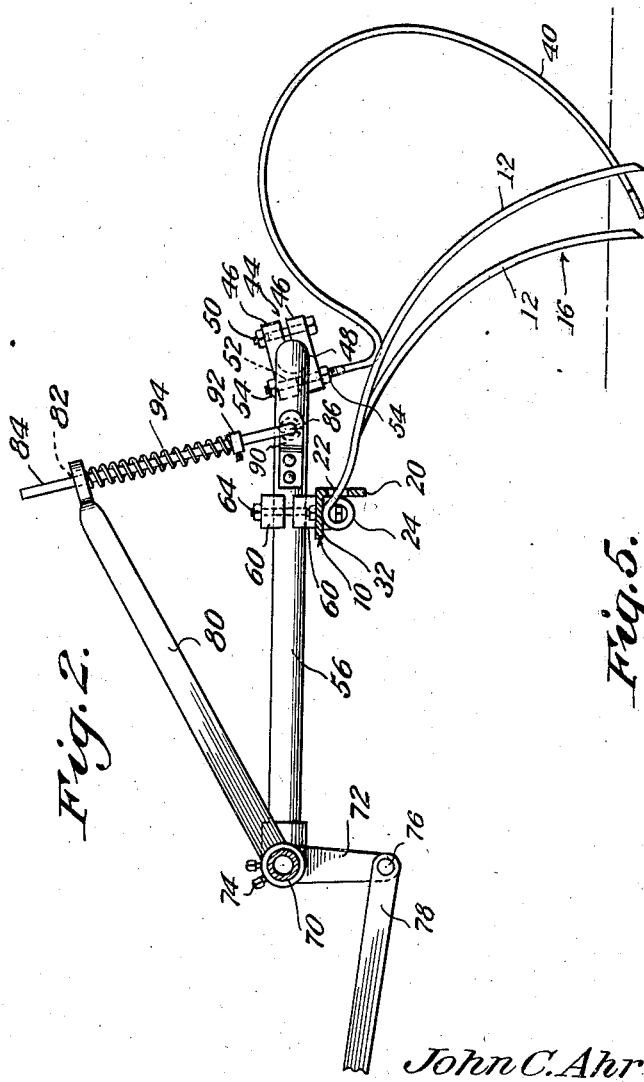
John C. Ahrens INVENTOR
BY Victor J. Evans & Co.
ATTORNEYS Patented Jan. 7, 1941

2,227,774

UNITED STATES PATENT OFFICE 2,227,774

CULTIVATOR WEEDER ATTACHMENT

John C. Ahrens, Heron Lake, Minn.

Application March 9, 1939, Serial No. 260,834

1 Claim. (Cl. 97—47)

My invention relates to agricultural implements, and has among its objects and advantages the provision of an improved cultivator weeder attachment.

An object of my invention is to provide a weeder attachment adapted for connection with corn cultivators and the like, in which the weeder embodies weeding tines arranged in such a manner as to facilitate self cleaning so as to prevent the accumulation of weed roots and the like. The attachment is particularly adapted to cultivators of the tractor type, and is designed to span two rows of corn. The weeding tines are formed of resilient material, and are resiliently mounted with alternate tines spaced forwardly of the other tines.

In addition, the two tines positioned at each end of the line of tines are shorter than the remaining tines, and are so arranged as to straddle two rows of corn. Thus the corn may be cultivated close to the growth without damage to the roots, while the remaining tines penetrate the soil to such a depth as to perform an efficient weeding function. Means are associated with the weeding tines to impart a vigorous cultivating action on the soil traversed by the tractor wheels. The tines perform an efficient cultivating action so as to pulverize the soil in addition to their weeding function.

In the accompanying drawings,

Figure 2 is a sectional view along the line 2—2 of Figure 1;

Figure 3 is a detailed view of the tine mounting;

Figure 4 is a sectional view along the line 4—4 of Figure 3, and

Figure 5 is a perspective view of a portion of the frame structure.

Figure 1:
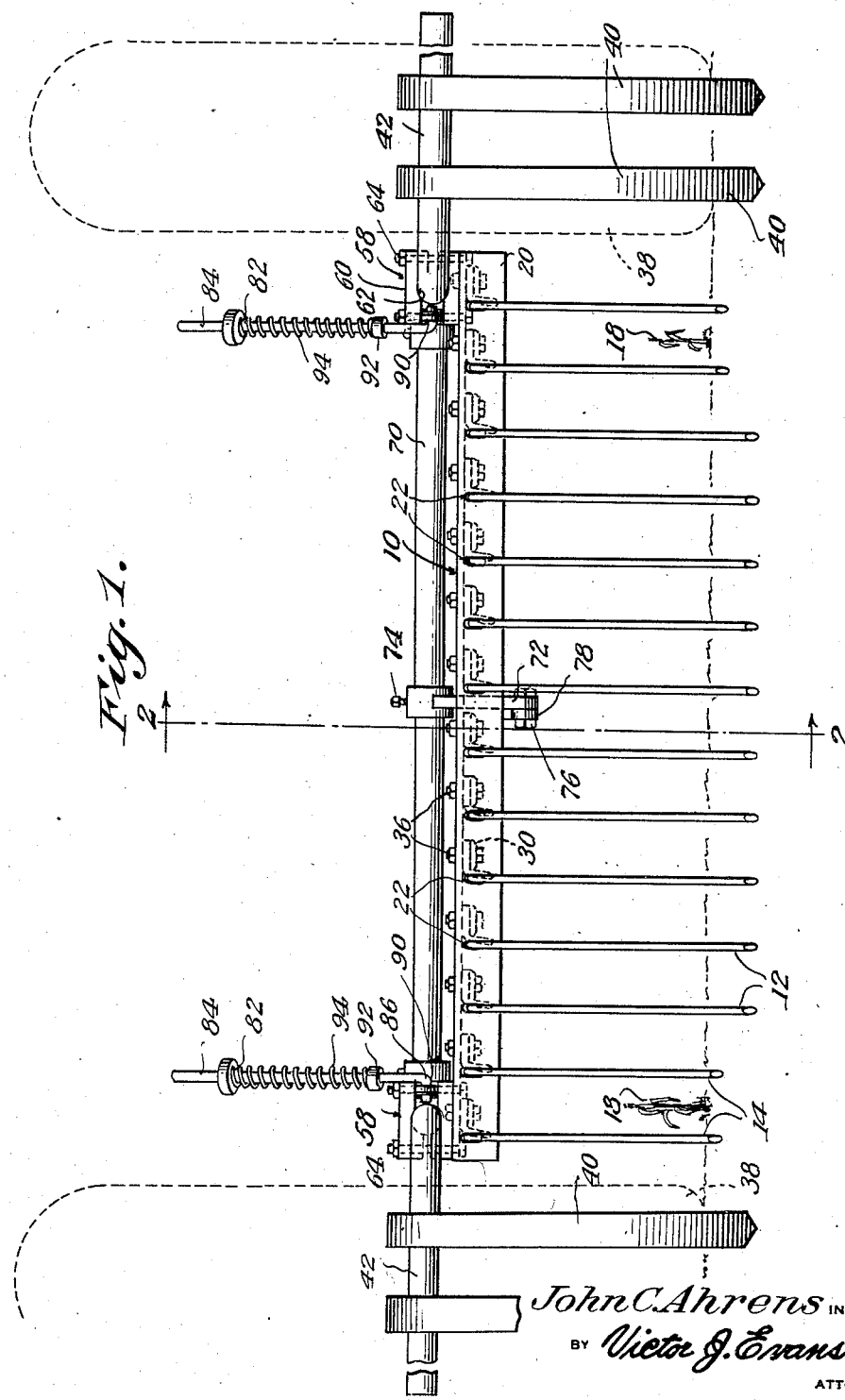
Figure 1 is a rear elevational view of the invention.

In the embodiment selected to illustrate my invention, I make use of a cross beam 10 which may comprise an angle iron to which I connect a plurality of long tines 12, and shorter tines 14. Tines 12 and 14 are bowed, as illustrated in Figure 2, with the concavities of the tines facing the direction of travel. Alternate tines 12 and 14 take normal positions in advance of the remaining tines, as illustrated at 16 in Figure 2.

The tines 12 are identical in construction with the exception of the alternate offset arrangement illustrated in Figure 2. Tines 14 are also identical in construction, with the exception of their offset arrangement. Figure 1 illustrates the tines 12 as being of equal length so far as cultivating depth is concerned, while the tines 14 are also of common length with respect to cultivating depth. All the tines are equally spaced along the beam 10 and the overall length of the tine assembly is sufficient to span two rows of corn 18. Each row of growth 18 is positioned between two of the tines 14.

All the tines are connected with the beam 10 in the same manner so that description of one will apply to all. Referring to the Figures 3 and 4, the vertical flange 20 of the beam 10 is slotted at 22 for the reception of the tines 12 and 14. Each tine is provided with a convolution 24, and a right angular reach 26 located in a recess 28 in a plate 30 positioned underneath the horizontal flange 32 of the beam.

Plate 30 and the flange 32 are provided with an aligned opening 34 for the reception of a bolt 36 which clamps the plate to the flange 32. At the same time, the right angular reach 26 lies adjacent the vertical flange 20 so as to be held in the recess 28. While the slots 22 are considerably longer than the diameter of the tines 12 and 14, the right angular reaches 26 are restrained from relative longitudinal movements because of the close fitting relation between the sides of the recesses and the tines proper.

The tines are formed of suitable spring material so as to yield when meeting heavy obstructions such as rocks to prevent damage to the tines. However, the tines are sufficiently stiff to penetrate the soil to the necessary cultivating depth for the removal of weeds and weed roots. Convolutions 24 lend additional resiliency to the tines in the vicinity of their connections with the beam 10 so as to afford additional protection for the tines.

Slots 22 provide accommodation for relative movement of the tines. While the tines 12 and 14 are closely spaced, as when viewing Figure 1, the alternate offsetting of the tines, as illustrated in Figure 2, provides an arrangement which facilitates cleaning of weeds and weed roots. I have found that such an arrangement of tines eliminates accumulation of weed roots removed from the soil. While the tines 14 are closely related to the rows 18, their shallow cultivating depth affords protection for the roots of the growth.

In Figure 1, I indicate generally the tractor wheels at 38. Adjacent each end of the beam 10 I mount two flat spring tines 40 which are so located as to cultivate the soil traversed by the tractor wheels 38. Figure 2 illustrates the curvature of the spring piece 40, which curvature is considerably more pronounced than in the tines 12 and 14. Figures 1 and 2 illustrate the flat spring tines 40 as being mounted on shafts 42 which parallel the beam 10 but are spaced somewhat rearwardly thereof.

Figure 2 illustrates the manner in which the tines 40 are connected with the shaft 42. Only one mount is illustrated, but all the mounts are identical in construction. The clamp 44 comprises sections 46 recessed at 48 to partly embrace the shaft 42. Bolt 50 passes through one end of the sections 46, while the tines 40 are provided with threaded ends 52 extending through openings in the other end of the sections 46 for the reception of nuts 54 so that the sections may be firmly clamped upon the shaft 42.

Shafts 42 constitute right angular extensions of shaft runs 56 to which the beam 10 is secured. The clamp 58 is mounted on each end of the horizontal flange 32 of the beam 10. Each clamp 58 comprises sections 60 which are recessed at 62 to partly embrace the respective shaft run 56. Bolts 64 extend through openings in the flange 32 and the section 60 is for clamping the parts into a unitary assembly as well as in fixed relation with the shaft run 56.

To the forward end of the shaft run 56 I connect T-couplings 66 which have tubular parts 68 rotatably mounted on a cross bar 70 which constitutes a mount for the tractor coupling (not shown and which forms no part of the present invention). An arm 72 is keyed to the pipe 70 by a set screw 74. The lower end of the arm 72 is pivotally connected at 76 with a link 78 which may be connected with a lever operated from the tractor. Arms 80 are fixedly related to the pipe 70 and have their upper ends bored at 82 for slidably receiving a shaft 84 provided with right angular bends 86 passed through openings 88 in brackets 90 bolted to the runs 56.

A collar 92 is fixedly related to each of the rods 84, and between each collar 92 and the upper end of the associated bar 80 I interpose a compression spring 94. Link 78 and its associated parts such as the bars 80, the rods 84, and the springs 94 are old and well known in the art and need not be described in further detail. Suffice it to say that the pipe 70 may be rotated through the medium of the link 78 to compress the springs 94 for applying variable pressure on the tines 12, 14 and 40.

Without further elaboration, the foregoing will so fully illustrate my invention that others may, by applying current knowledge, readily adapt the same for use under various conditions of service.

I claim:

In a tractor-drawn agricultural device of the type described, a generally U-shaped frame structure having its legs bent to provide two shafts projecting in opposite directions, a beam extending at right angles to said legs and fixedly secured thereto, ground engaging tines carried by said beam, heavy duty tines carried by said shafts, said shafts paralleling said beam but being located rearwardly thereof to bring said heavy duty tines directly in the rear of the traction wheels of the tractor.

JOHN C. AHRENS.